United States Patent
Salo et al.

(10) Patent No.: US 7,925,254 B2
(45) Date of Patent: *Apr. 12, 2011

(54) RECEIVER

(75) Inventors: Juha Salo, Littoinen (FI); Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/880,037

(22) Filed: Jul. 18, 2007

(65) Prior Publication Data

US 2008/0009276 A1 Jan. 10, 2008

Related U.S. Application Data

(63) Continuation of application No. 09/893,890, filed on Jun. 29, 2001, now Pat. No. 7,283,817.

(30) Foreign Application Priority Data

Jun. 30, 2000 (GB) .................................. 0016238.8

(51) Int. Cl.
*H04W 4/00* (2009.01)
(52) U.S. Cl. ...................... 455/426; 455/425; 455/432.2; 455/407; 455/414.1; 455/432.3
(58) Field of Classification Search .................. 455/426, 455/413, 5.1, 4.2; 725/75, 1, 77, 30
See application file for complete search history.

(56) References Cited

U.S. PATENT DOCUMENTS

| | | | |
|---|---|---|---|
| 5,822,324 A | 10/1998 | Kostresti et al. | 370/487 |
| 5,960,086 A | 9/1999 | Atalla | 380/44 |
| 6,005,603 A | 12/1999 | Flavin | 348/9 |
| 6,023,689 A | 2/2000 | Herlin et al. | 705/67 |
| 6,052,145 A | 4/2000 | Macrae et al. | 348/10 |
| 6,081,693 A | 6/2000 | Wicks | 455/31.3 |
| 6,510,515 B1 | 1/2003 | Raith | 713/163 |
| 6,567,796 B1 | 5/2003 | Yost et al. | 707/2 |
| 6,580,906 B2 | 6/2003 | Bilgic et al. | 455/422 |
| 6,606,481 B1 * | 8/2003 | Tegler et al. | 725/63 |
| 6,662,020 B1 | 12/2003 | Aaro et al. | 455/552.1 |
| 6,674,860 B1 | 1/2004 | Pirila | 380/247 |
| 6,707,915 B1 | 3/2004 | Jobst et al. | 380/247 |

(Continued)

FOREIGN PATENT DOCUMENTS

AU 1659299 7/1999

(Continued)

OTHER PUBLICATIONS

GB Search Report dated Jan. 4, 2001, Application No. GB 0016238.8, 1 page.

(Continued)

*Primary Examiner* — David Q Nguyen
(74) *Attorney, Agent, or Firm* — Harrington & Smith

(57) ABSTRACT

Cellular receivers, in the form of portable radiotelephones are commonplace, and their design and operation is well understood. Such portable radiotelephones can be used for making and receiving telephone calls, sending and receiving messages, and even browsing world-wide computer network such as the Internet. Many standards exist for portable radiotelephones, including global system for mobile communications (GSM), general radio packet service (GPRS).

Receivers capable of receiving digital television signals; such as signals according to the terrestrial digital video broadcasting (DVB-T) standard are also commonplace.

The present invention provides a method and apparatus for receiving and transmitting signals via multiple communication channels.

25 Claims, 2 Drawing Sheets

U.S. PATENT DOCUMENTS

| | | | |
|---|---|---|---|
| 6,774,926 B1 | 8/2004 | Ellis et al. | 348/14.01 |
| 6,804,357 B1 * | 10/2004 | Ikonen et al. | 380/241 |
| 7,280,660 B2 * | 10/2007 | Salo et al. | 380/200 |
| 7,283,817 B2 * | 10/2007 | Salo et al. | 455/426.1 |
| 7,548,518 B2 * | 6/2009 | Salo et al. | 370/259 |
| 2002/0039904 A1 | 4/2002 | Anderson | 455/456 |
| 2002/0059614 A1 | 5/2002 | Lipsanen et al. | 725/75 |
| 2002/0095333 A1 * | 7/2002 | Jokinen et al. | 705/14 |

FOREIGN PATENT DOCUMENTS

| | | |
|---|---|---|
| CN | 1288619 | 3/2001 |
| DE | 4424380 | 1/1996 |
| EP | 0179612 | 4/1986 |
| EP | 0191684 | 8/1986 |
| EP | 0696152 | 2/1996 |
| EP | 0763942 | 3/1997 |
| EP | 0782364 | 7/1997 |
| EP | 0901246 | 9/1997 |
| EP | 0957606 | 11/1999 |
| EP | 0999678 | 5/2000 |
| EP | 1300035 | 4/2003 |
| EP | 0804012 | 7/2007 |
| GB | 2294844 | 5/1996 |
| GB | 2335576 | 9/1999 |
| WO | WO 96/36141 | 11/1996 |
| WO | WO 98/56181 | 12/1998 |
| WO | WO 99/04568 | 1/1999 |
| WO | WO 99/33076 | 7/1999 |
| WO | WO 99/35771 | 7/1999 |
| WO | WO 00/18123 | 3/2000 |

OTHER PUBLICATIONS

GB Search Report dated Jan. 17, 2001, Application No. GB 0016245. 3, 3 pages.

GB Search Report dated Feb. 21, 2001, Application No. GB 0016245. 3, 2 pages.

International Search Report dated Nov. 30, 2001, Application No. PCT/EP01/07239, 7 pages.

International Search Report dated Feb. 21, 2002, Application No. PCT/EP01/07209, 3 pages.

European Search Report dated Jul. 21, 2004, Application No. EP 04 00 0799, 3 pages.

Chinese Office Action dated Mar. 12, 2004, Chinese Application No. CN 0184700.3, 10 pages.

European Office Action dated Jan. 31, 2005, Application No. 01 957 887.1, 5 pages.

European Telecommunications Standard Institute, Digital video Broadcasting (DVB); Interaction channel through the Global System for Mobile communications (GSM), Feb. 1999, 14 pages.

* cited by examiner

RECEIVER

CROSS-REFERENCE TO RELATED APPLICATION

This is a continuation of U.S. patent application Ser. No. 09/893,890, filed on Jun. 29, 2001, now U.S. Pat. No. 7,283,817 and claims priority thereto.

BACKGROUND OF THE INVENTION

The present invention relates to receivers such as multi-carrier and cellular receivers.

Cellular receivers, in the form of portable radiotelephones are commonplace, and their design and operation is well understood. Such portable radiotelephones can be used for making and receiving telephone calls, sending and receiving messages, and even browsing world-wide computer network such as the Internet. Many standards exist for portable radiotelephones, including global system for mobile communications (GSM), general radio packet service (GPRS).

Receivers capable of receiving digital television signals, such as signals according to the terrestrial digital video broadcasting (DVB-T) standard are also commonplace.

The use and operation of consumer set-top-boxes (STB) for receiving digital video broadcasting (DVB-T) transmissions are well known. Such STBs are capable of receiving a large number of digital television channels, data and other interactive services.

SUMMARY OF THE INVENTION

According to a first aspect of the present invention, there is provided a terminal having a first receiver for receiving a first signal from a first communications network comprising: a second receiver for receiving a second signal conveying complementary information relating to said first signal from a second communications network.

Advantageously, the present invention provides a receiver having a first and a second receiver for receiving signals from two different communications networks. In a first embodiment of the present invention this results in increased power efficiency, since one of the receivers can be effectively switched off whilst not required. Schedule or configuration data can, however, still be received on the other receiver.

The received schedule or configuration data can be used to switch on the other receiver at an appropriate time. This configuration allows the receiver to receive non-scheduled data, such as news flashes, results from sporting events, share prices etc.

According to a second aspect of the present invention, there is provided apparatus for transmitting a signal to a receiver via a first communications network comprising: a transmitter for transmitting complementary information relating to said signal via a second communication network.

According to a third aspect of the present invention, there is provided a method of receiving a first signal from a first communications network comprising: receiving a second signal conveying complementary information relating to said first signal from a second communications network.

According to a fourth aspect of the present invention, there is provided a method of transmitting a signal to a receiver via a first communications network comprising: transmitting complementary information relating to said signal via a second communication network.

BRIEF DESCRIPTION OF THE DRAWINGS

The invention will now be described, by way of example only, with reference to the accompanying diagrams, in which.

DETAILED DESCRIPTION OF THE INVENTION

Figure 1:
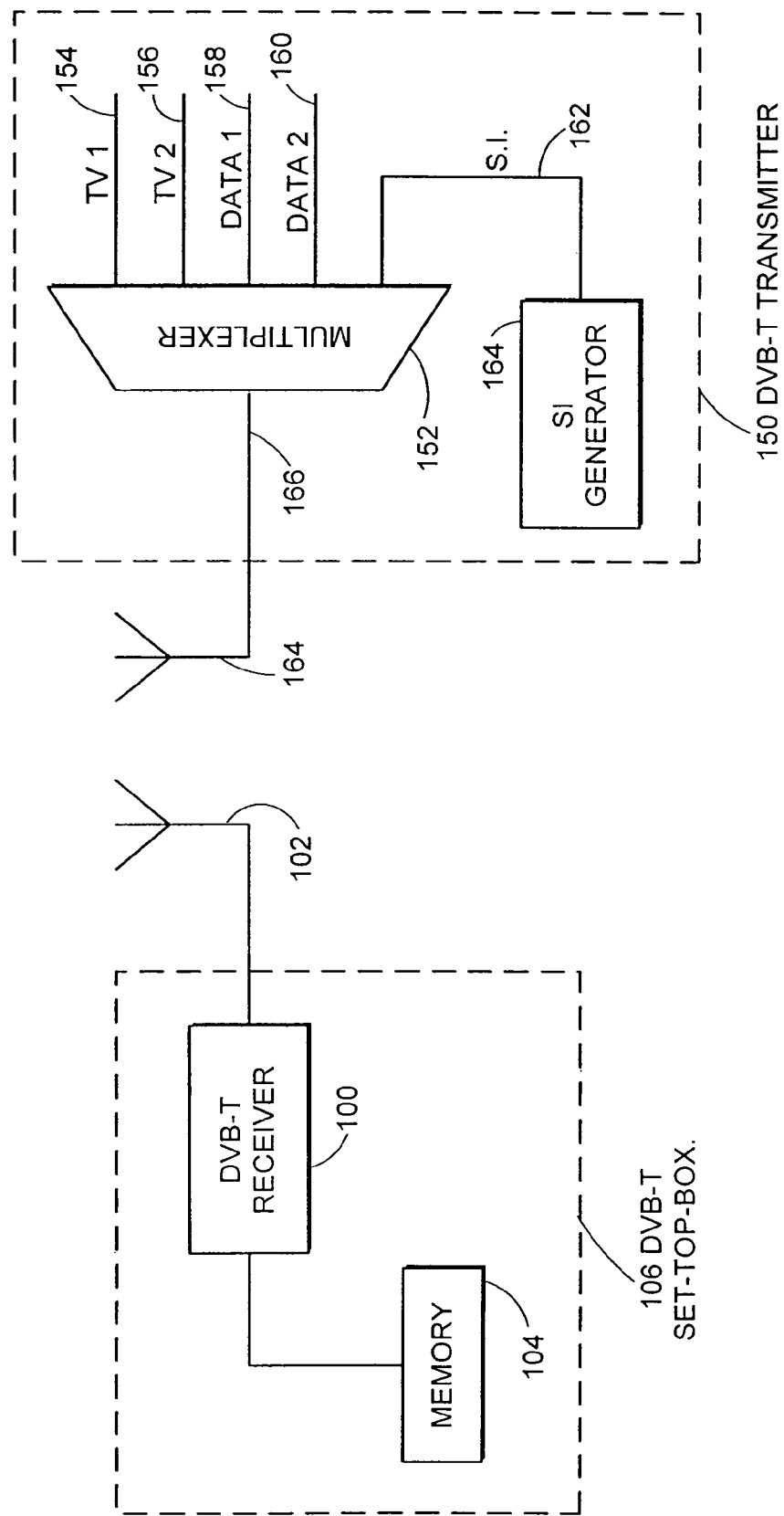
FIG. 1 is a block diagram of a typical consumer receiver/transmitter arrangement.

FIG. 1 is a block diagram of a typical consumer receiver/transmitter arrangement in which a terrestrial digital video broadcasting (DVB-T) transmitter 150 transmits a DVB-T signal to a DVB-T set-top-box receiver 106.

In the transmitter 150, a number of television channels 154 and 156 are multiplexed together with a number of data channels 158 and 160 by a multiplexer 152. In addition to this, service information (SI) 162, which contains details of each of the other multiplexed channels, is also input to the multiplexer 152, provided by a SI generator 164. The multiplexer creates a single, multiplexed, signal 166 which contains all of the separate channels 154, 156, 158 and 160, along with the SI 162. Further details of the multiplexing and SI may be found in the DVB-T specification (EN 300 468) which is incorporated herein by reference. The multiplexed signal 166 is transmitted via an antenna 164, across a transmission channel, to an antenna 102 of a set-top-box receiver 106. In the case of DVB-T, the transmission channel is a terrestrial transmission channel. However, the transmission channel could, alternatively, be a satellite, microwave, cable or optical channel.

The signals received by the antenna 102 are input to a DVB-T receiver 100 which enables the user to select a desired channel. Received data may also be stored in a memory 104.

Whilst the set-top-box 106 is switched on, the DVB-T receiver 100 is also powered up and receiving DVB-T signals. The DVB-T receiver is constantly decoding SI information which provides details of the content and location of each of the channels within the received multiplexed signal. The SI information also contain schedule details for each of the multiplexed channels. The schedule details allow a user to watch or record a specific programme of interest. For example, if the set-top-box 106 is connected to a personal computer (not shown), it is possible to receive data transmitted over the DVB-T network for use with the personal computer. In this way, the transmission of large data files can be broadcast, to a large audience, using the high data rates provided by DVB-T transmission. If a data file is due to be transmitted at a certain time on a certain channel, the SI information will contain this information which can be used by the personal computer to ensure that receiver receives the required data.

SI information may change frequently, to reflect not only changes in program scheduling, but also to reflect re-allocation of frequencies and channels etc by the broadcaster. For example, it is possible for a channel to broadcast on a different frequency to originally scheduled. Since the SI contains details of the frequencies (or changes to the frequencies), a receiver should always be able to receive the desired channel and/or program. Some set-top-boxes store SI information in a memory, thereby allowing users to browse a schedule or program guide. However, due to the nature of SI information, the SI information is updated frequently to ensure that no discrepancies exist between the SI stored by the set-top-box and the SI being transmitted by the broadcaster.

Figure 2:
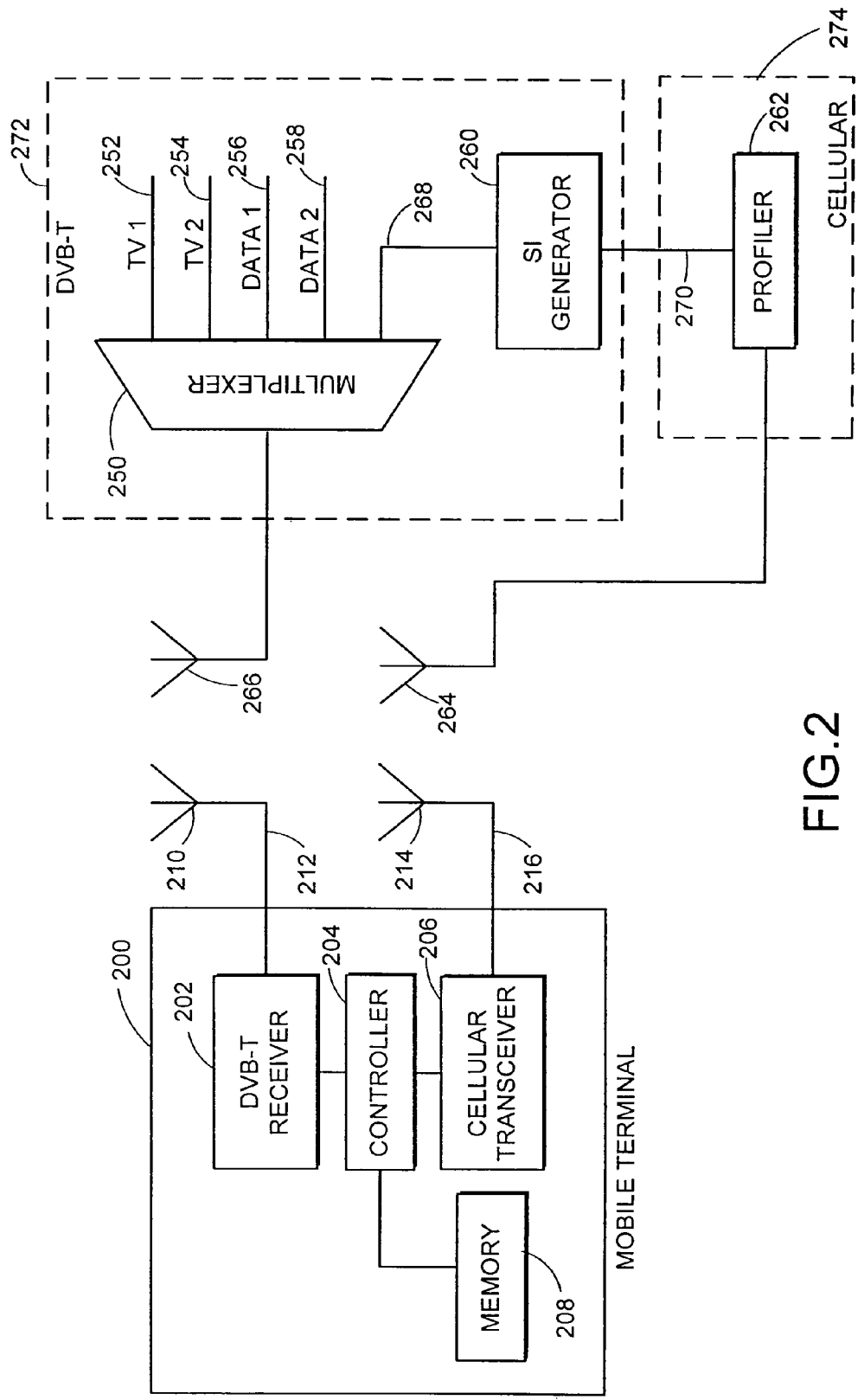
FIG. 2 is a block diagram of a first embodiment. according to the present invention.

FIG. 2 shows a block diagram of a first embodiment according to the present invention. A mobile terminal 200 receives DVB-T transmissions from a DVB-T transmitter 272. The transmitted DVB-T signal is a multiplexed signal produced by a multiplexer 250. The multiplexer 250 accepts as inputs a number of channels 252, 254, 256 and 258 to produce the multiplexed signal. The channels may be television, audio or data channels. Service information (SI) data, which contains details of the multiplexed channels, is also input to the multiplexer 250. The SI data is generated by a SI generator 260, which may be a database containing schedule and location details of each of the channels.

The DVB-T signals are received by an antenna 210 of the mobile terminal 200 and are received and decoded by a DVB-T receiver 202.

In addition, and advantageously, the mobile terminal also receives an interactive channel from a cellular or other transmission network 274 at a cellular transceiver 206. The cellular transceiver 206 allows both the reception and transmission of signals between the mobile terminal 200 and the cellular network 274. The cellular network may be a GSM network, a general packet radio service (GPRS), third generation (3G) or other suitable network.

SI data generated by the SI generator 260 is also supplied to a profiler 262 of the cellular network 274. The profiler contains a database of information about each of the subscribers to the cellular network 274. The profiler may contain information such as, demographic data, income level, sports leisure interests, etc.

The operation of a first embodiment of the present invention will now be described by way of example.

According to the prior art, if a user wishes to receive a video clip each time his favourite football team scores during a football match, it is necessary that the DVB-T receiver 100 in the DVB-T set-top-box 106 is constantly powered up and is constantly receiving SI data. This is since the exact timing of when a goal will be scored is not known in advance. Accordingly, no schedule will exist in the SI data for this event. A DVB-T receiver must therefore wait for the SI data to indicate when the video clip will be broadcast. If the user is only interested in receiving video clips of the football match, this is particularly inefficient in terms of power consumption, especially for mobile terminals, since the DVB-T receiver just waiting, consuming power, for a specific video clip to be broadcast.

According to a first embodiment of the present invention, as exemplified in FIG. 2, the subscriber registers his interest in receiving video clips with the profiler 262 of the cellular network 274. The DVB-T receiver 202 of the mobile terminal 200 may then be powered down. When a goal is scored, and a video clip is available for broadcast, the broadcaster must schedule the video clip to be included in the existing DVB-T multiplex signal. This may involve rescheduling existing programs, and updating the SI data accordingly. Once a scheduled time has been established for the broadcast of the video clip, a service announcement is sent by the cellular network 274 to the cellular transceiver 206. The service announcement is received by the cellular transceiver 206 and is processed by the controller 204. The controller informs the DVB-T receiver 202 of when the video clip will be broadcast and other relevant associated data, such as channel location, encryption parameters etc. The DVB-T receiver can be powered up and configured in time to receive and decode the video clip. The video clip may also be stored in a memory 208. Once the desired video clip, or other data, has been received, the DVB-T receiver 202 can be once again powered down.

The service announcement may be in the form of SI data, or may alternatively be in the form of a special short message service (SMS) message containing the necessary timing and location information required by the DVB-T receiver. Alternative forms of service announcement may be used, both in terms of the data required to be sent and the protocol which is used for sending it.

In this way, the DVB-T receiver 202 can be powered down when not required for actual reception of data. This can produce large savings in power consumption, compared to the system of the prior art.

The profiler 262 also controls whether requested information is transmitted to a user via the DVB-T or cellular network. For example, if one million people have requested to see a video clip of goals from a particular football match, it is better to transmit the video clip via the DVB-T network. For such a large number of users, the DVB-T network provides a cost effective delivery means. The alternative would be to individually send the video clip via the cellular network which, with so many users, could impact severely on the operation of the cellular network.

In a particular embodiment, the DVB-T transmitter 272 includes storage means such as a memory for storing details of subscriber preferences, and decision means such as a processor for deciding which subscribers to transmit the second signal in dependence on the stored subscriber preferences.

If the number of users requesting to see a particular video clip is much smaller, it may be more economical to send it individually via the cellular network. The exact threshold levels will vary according to the pricing structure of the DVB-T and cellular networks, as well as the number of users requesting a particular item, and the volume of data required to be sent.

The cellular transceiver 206 may also be used to send an acknowledgement back to the cellular network 274, indicating whether the video clip was correctly received. This may be used for billing purposes, or also to request a re-sending of the video clip if it not received due to poor signal strength etc. Re-sending of the video clip may again take place either via the DBV-T or cellular network depending on demand and cost effectiveness.

A further advantage of the present invention is that, if schedule announcements are sent over the cellular network, it is possible to remove some or all of the SI data from DVB-T network. Since the SI data typically occupies up to 3 $\text{Mbits}^{-1}$ this redundant bandwidth could be used for providing additional data or video channels.

In a further embodiment of the present invention, a profiler may be included in the mobile terminal 200. This may be instead of, or in addition to, the profiler 262 of the cellular network 274. A profiler on the mobile terminal may be used if the communications network used for the interactive channel supports broadcasting of data, such as via a GPRS network or other packet type network. The profiler can be configured according to user preferences, and will only accept service announcements which comply with the user preferences.

Those skilled in the art will appreciate that although the present invention is described above with reference to DVB-T transmissions, the invention is not limited thereto. The same techniques could be applied to DVB (satellite) reception and transmission or any other similar or equivalent standards. Equally, references to cellular networks and cellular transmission techniques could be replaced by fixed line, public switched telephone networks, or any other type of suitable communications network.

It will be apparent from the foregoing the present invention is not limited to the delivery of televisual content. Indeed, as has been indicated previously, digital video broadcasting may provide data and other interactive services.

For example, on-line banking and other customer orientated services can use the present invention to improve the transmission of data, including Internet pages, to subscribers. For example, an on-line bank could broadcast using the broadcast network pages of information containing high quality graphics, standard texts etc. Each page could then be personalised using personal data transmitted over an interactive channel provided by a second network such as GSM, GPRS or other future generation network. For example, a generic 'balance' sheet could be broadcast to all users containing the bank logo, background images etc. Personal balance data transmitted over the interactive channel could then be combined with the broadcast 'balance' sheet, to present to the user their own personal balance sheet.

An exemplary embodiment in accordance with this invention is an apparatus for transmitting a signal to a receiver via a first communications network. The apparatus includes a transmitter for transmitting complementary information relating to said signal from a second communications network. The complementary information may include schedule and configuration data.

What is claimed is:

1. An apparatus comprising a processor configured:
   to select a subscriber based on subscriber preferences; and
   to send a second signal, in conjunction with a first signal transmitted over a first communications network, comprising complementary schedule and configuration data relating to the first signal via a second communications network to the selected subscriber.

2. An apparatus according to claim 1, wherein said first signal is a digital video broadcasting (DVB) signal, and said first communications network is a digital video broadcasting (DVB) network.

3. An apparatus according to claim 1, wherein said second communications network is a global system for mobile (GSM) network, and further comprising a global system for mobile (GSM) transmitter.

4. An apparatus according to claim 1, wherein said second communications network is a general packet radio service (GPRS) network and further comprising a general packet radio service (GPRS) transmitter.

5. An apparatus according to claim 1, further comprising:
   a receiver configured to receive a request for non-scheduled content to be included in said first signal;
   wherein responsive to said request, said processor is configured to send service information via the second communications network identifying an availability of said non-scheduled content.

6. An apparatus according to claim 5, wherein said service information is generated in accordance with changes to scheduled content to include said non-scheduled content in said first signal.

7. An apparatus according to claim 5, wherein said service information includes the complementary schedule and configuration data relating to said first signal.

8. An apparatus according to claim 5, wherein said service information identifies a time and channel location at which said non-scheduled content will be transmitted.

9. An apparatus according to claim 1, wherein the first communications network is unidirectional and wireless and the second communications network is interactive and wireless.

10. An apparatus according to claim 9, wherein the first signal comprises a plurality of multiplexed television and/or audio channels.

11. An apparatus according to claim 10, wherein the second signal comprises encryption parameters for at least one of the multiplexed channels.

12. An apparatus according to claim 10, wherein the second signal comprises time, channel, and encryption parameters for identifying and receiving a video clip from among the multiplexed channels.

13. An apparatus according to claim 1, wherein the second signal is a short message service message.

14. An apparatus according to claim 1, wherein the schedule and configuration data comprises at least one of timing information or location information.

15. An apparatus according to claim 1, wherein the second communications network is a cellular network.

16. An apparatus comprising:
   transmitting means for transmitting, in conjunction with a first signal transmitted over a first network, a second signal comprising complementary schedule and configuration data relating to said first signal to a selected subscriber via a second communications network; and
   decision means for selecting a subscriber in dependence on subscriber preferences.

17. The apparatus of claim 16, wherein:
   the transmitting means comprises a transmitter; and
   the decision means comprises a processor.

18. A method comprising:
   selecting, by a processor, a subscriber in dependence on subscriber preferences; and
   in conjunction with a first signal transmitted over a first communications network, sending a second signal via a second communications network to the selected subscriber, said second signal comprising complementary schedule and configuration data relating to said first signal.

19. A method according to claim 18, wherein said first signal is a digital video broadcasting (DVB) signal.

20. A method according to claim 18, wherein the second communications network is a global system for mobile (GSM) network.

21. A method according to claim 18, wherein the second communications network is a general packet radio service (GPRS) network.

22. A method according to claim 18, further comprising receiving a request for non-scheduled content to be included in said first signal and transmitting service information via the second communications network identifying availability of said non-scheduled content.

23. A method as claimed in claim 22, wherein said service information is generated in accordance with changes to scheduled content to include said non-scheduled content in said first signal.

24. A method as claimed in claim 22, wherein said service information includes the complementary schedule and configuration data relating to said first signal.

25. A method as claimed in claim 22, wherein said service information identifies a time and channel location at which said non-scheduled content will be transmitted.

* * * * *